US012488928B2

(12) United States Patent
Scala

(10) Patent No.: US 12,488,928 B2
(45) Date of Patent: Dec. 2, 2025

(54) METHOD FOR DRYING A TRANSFORMER HAVING A MULTISTAGE COOLING SYSTEM, AND COOLING DEVICE CONTROLLER FOR SUCH A TRANSFORMER

(71) Applicant: Siemens Energy Global GmbH & Co. KG, Munich (DE)

(72) Inventor: Mario Scala, Graz (AT)

(73) Assignee: Siemens Energy Global GmbH & Co. KG, Munich (DE)

( * ) Notice: Subject to any disclaimer, the term of this patent is extended or adjusted under 35 U.S.C. 154(b) by 1081 days.

(21) Appl. No.: 17/604,502

(22) PCT Filed: Mar. 31, 2020

(86) PCT No.: PCT/EP2020/059101
§ 371 (c)(1),
(2) Date: Oct. 18, 2021

(87) PCT Pub. No.: WO2020/212133
PCT Pub. Date: Oct. 22, 2020

(65) Prior Publication Data

US 2022/0208432 A1 Jun. 30, 2022

(30) Foreign Application Priority Data

Apr. 18, 2019 (EP) .................................... 19170055

(51) Int. Cl.
*H01F 7/06* (2006.01)
*H01F 27/02* (2006.01)
(Continued)

(52) U.S. Cl.
CPC .......... *H01F 27/14* (2013.01); *H01F 27/025* (2013.01); *H01F 27/32* (2013.01)

(58) Field of Classification Search
CPC ........ H01F 27/025; H01F 27/14; H01F 27/32; H01F 27/402
See application file for complete search history.

(56) References Cited

U.S. PATENT DOCUMENTS

| | | | |
|---|---|---|---|
| 4,456,899 | A | 6/1984 | Matthes et al. |
| 2002/0113599 | A1 | 8/2002 | Hoffman |

(Continued)

FOREIGN PATENT DOCUMENTS

| | | | |
|---|---|---|---|
| CN | 101908404 | A | 12/2010 |
| CN | 201796683 | U | 4/2011 |

(Continued)

OTHER PUBLICATIONS

Borsi H et al: "Drying of transformer insulation using zeolite", IEEE Electrical Insulation Magazine, IEEE Service Center, New York, NY, US, vol. 20, No. 1, pp. 20-30, XP011107478, ISSN: 0883-7554, DOI: 10.1109/MEI.2004.1266362 ; the whole document; 2004.

(Continued)

*Primary Examiner* — Paul D Kim
(74) *Attorney, Agent, or Firm* — Laurence A. Greenberg; Werner H. Stemer; Ralph E. Locher

(57) ABSTRACT

A method for drying a transformer which has a multistage cooling system, in particular a power transformer or a choke, has at least one transformer winding and at least one insulator for electrical insulation. Individual cooling stages of the cooling system are respectively associated with a loading state range of the transformer and are activated when the respective loading state range of the transformer is reached. The loading state range is a function which depends at least on a temperature of the transformer. The drying method is carried out during the operation of the transformer. An upper cooling stage, which lies above the lowest cooling stage, is or remains deactivated and the cooling
(Continued)

stage which is situated directly below the upper cooling stage is or remains activated while the transformer is in the loading state range which is associated with the upper cooling stage.

18 Claims, 1 Drawing Sheet

(51) Int. Cl.

| | |
|---|---|
| ***H01F 27/14*** | (2006.01) |
| ***H01F 27/32*** | (2006.01) |

(56) References Cited

U.S. PATENT DOCUMENTS

| | | | | |
|---|---|---|---|---|
| 2013/0243033 | A1* | 9/2013 | Asano, Jr. ............. | H01F 27/008<br>374/152 |
| 2017/0301449 | A1* | 10/2017 | Michalik ............... | H01F 27/006 |
| 2019/0027292 | A1 | 1/2019 | Findeisen | |
| 2022/0076882 | A1* | 3/2022 | Scala .................... | H01F 27/323 |

FOREIGN PATENT DOCUMENTS

| | | | |
|---|---|---|---|
| CN | 108475573 | A | 8/2018 |
| CN | 108917983 | A | 11/2018 |
| DE | 19757955 | A1 | 7/1999 |
| EP | 0043511 | A1 | 1/1982 |
| WO | 2013171058 | A1 | 11/2013 |

OTHER PUBLICATIONS

Borsi H et al: "Life Extension of the Transformer Insulation with an Innovative Online Drying and Filtering system", XP055630367, Found on the Internet: URL:http://www.daneshir.ir/fileEssay/98-ETRN-387.pdf; [found on Oct. 9, 2019]; the whole document; 2003.

* cited by examiner

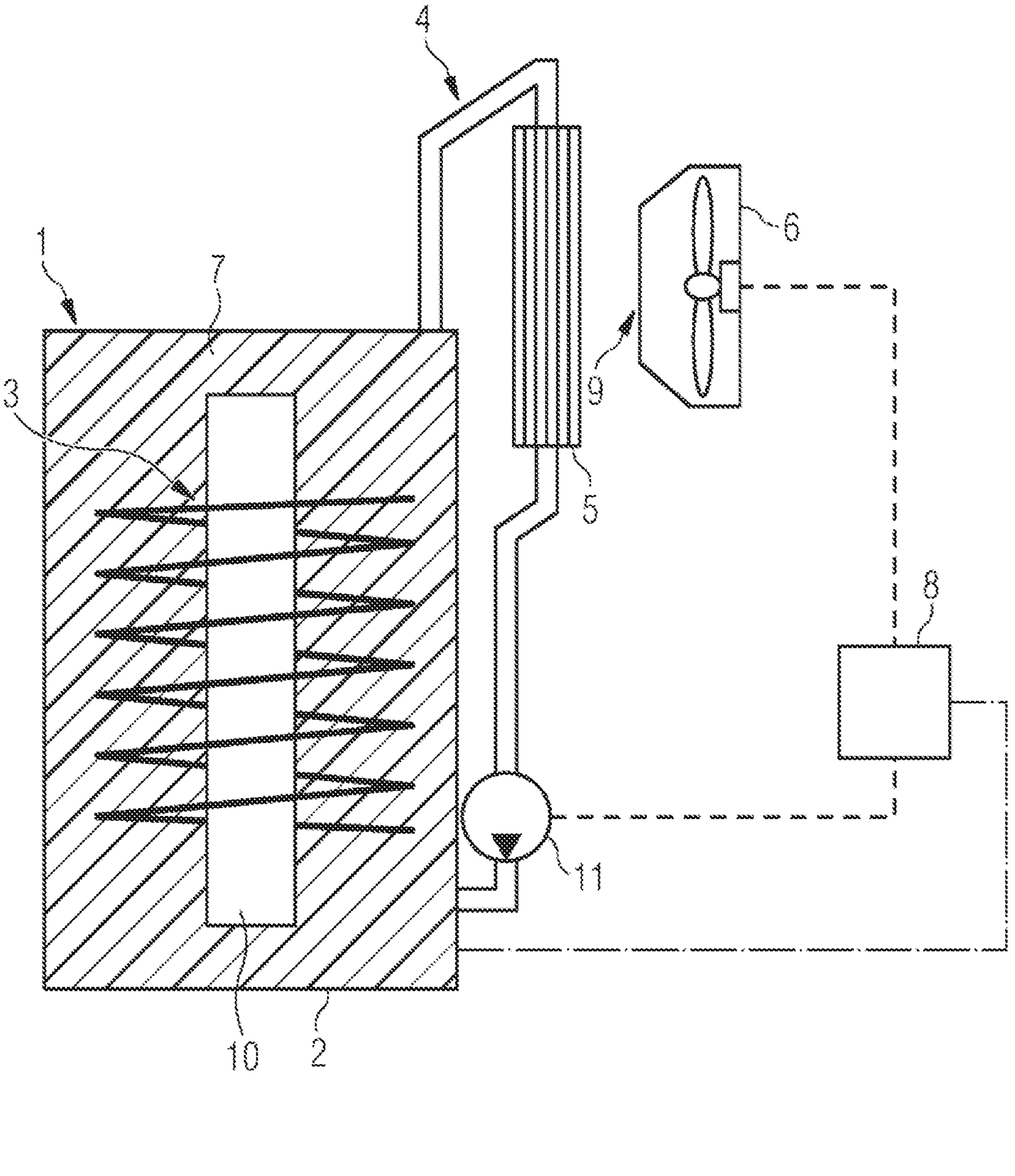
4
1
7
3
6
9
5
8
11
10
2

METHOD FOR DRYING A TRANSFORMER HAVING A MULTISTAGE COOLING SYSTEM, AND COOLING DEVICE CONTROLLER FOR SUCH A TRANSFORMER

FIELD OF THE INVENTION

The present invention relates to a method for drying a transformer having a multistage cooling system, in particular a power transformer or a choking coil, having at least one transformer winding and at least one insulating means for electrical insulation, wherein the cooling stages comprise a lowest cooling stage and a highest cooling stage, wherein the individual cooling stages are in each case associated with one loading state range of the transformer and are activated when reaching the respective loading state range of the transformer, wherein the loading state range is a function which depends at least on a temperature of the transformer, and wherein the method for drying is carried out during the operation of the transformer.

The present invention furthermore relates to a cooling device controller for a transformer having a multistage cooling system, in particular a power transformer or a choking coil, having at least one transformer winding and at least one insulating means for electrical insulation.

PRIOR ART

Power transformers represent investment goods with relatively high costs and a desired long service life. In order for the last-mentioned characteristic to be achieved, the material of the transformer, in particular of the transformer insulation, which above all serves for electrically insulating the transformer windings and comprises, for example, a combination of oil and cellulosic paper, in the production of a transformer is subjected to a drying process, because moisture accelerates the aging during operation. During operation, however, an increase of the moisture content arises, which is why transformers, in particular the material of the transformer insulation, may be dried from time to time in order for the durability of the transformers to be increased.

To this end it is known from the prior art for the active parts of transformers to be dried in a vapor-phase drying plant, cf. for example https://de.wikipedia/org/wiki/Vapour-Phase-Trocknung. Because the respective transformer to be dried to this end has to be moved into a drying oven, this drying obviously does not take place during the operation of the transformer and causes corresponding downtimes.

Furthermore known from the prior art are experiments with a view to drying during the operation, in which experiments filter cartridges are used so as to continuously absorb or extract, respectively, moisture from the transformer oil, or from the insulating liquid, respectively. The drying process by way of drying the insulating liquid is continued in the solid insulation. The extremely long process time required in practice, in particular for the solid insulation, which can even exceed one year, is disadvantageous here. Depending on the drying method, in particular in the case of extraction methods under vacuum, this can lead to a further disadvantage, specifically when assessing a transformer, because not only the dissolved moisture but also other dissolved components such as, for example, fault gases are removed from the insulating liquid. The state of the insulation system can thus no longer be monitored during the drying process by means of the usual oil analysis (cf. for example https://de.wikipedia.org/wiki/Leistungstransformator#Ölanalyse).

OBJECT OF THE INVENTION

It is therefore an object of the present invention to make available a possibility for rapidly drying transformers during the operation.

SUMMARY OF THE INVENTION

In order to achieve the mentioned object it is provided according to the invention in a method for drying a transformer having a multistage cooling system, in particular a power transformer or a choking coil, having at least one transformer winding and at least one insulating means for electrical insulation, wherein the cooling stages comprise a lowest cooling stage and a highest cooling stage, wherein the individual cooling stages are in each case associated with one loading state range of the transformer and are activated when reaching the respective loading state range of the transformer, wherein the loading state range is a function which depends at least on a temperature of the transformer, and wherein the method for drying is carried out during the operation of the transformer, that an upper cooling stage which lies above the lowest cooling stage is or remains deactivated, and the cooling stage lying directly below the upper cooling stage is or remains activated, while the transformer is situated in the loading state range associated with the upper cooling stage.

A loading state in the loading state range causes the transformer to age and is explicitly dependent at least on the temperature of the transformer.

The transformer at the specifically prevalent operating point is thus advanced to a higher temperature, the latter hereunder also being referred to as the "increased temperature", than without this measure.

"Range" in the term loading state range indicates, on the one hand, that this is not a mathematical point with which the cooling stage is associated but that the cooling stage is associated with a range of loading states that inevitably arise in practice. For example, in practice it makes no difference whether the temperature X° C. or a slightly different temperature, for example X° C.+0.1° C., is prevalent, whereby in mathematically strict terms there is nevertheless a loading state prevalent which slightly differs in quantitative terms. On the other hand, a specific temperature range and thus a specific range of loading states can be consciously associated with the respective cooling stage.

In the method according to the invention, a temperature increase to an increased temperature is caused by means of a suitably chosen reduction of the cooling output, thus without additional heating means. To the extent that the at least one insulating means comprises a solid insulation which contains in particular hygroscopic material such as cellulose (for example in solid material, so-called pressboard or wrapping paper), this increased temperature is sufficient to promote a diffusion of moisture from the solid insulation. To the extent that the at least one insulating means comprises a liquid insulation, in particular oil such as, for example, mineral oil, the absorption capacity of the liquid insulation for the moisture is increased by the increased temperature, wherein the moisture can be removed from the liquid in a manner known per se, for example by means of filter cartridges which in turn may contain, for example, cellulose or other suitable materials. This results in significantly faster and more efficient drying conditions, wherein the drying can be performed during the ongoing operation and typically lasts only a few weeks.

It is to be noted that "the temperature of the transformer" can in principle be understood to include different indicators, for example a hot oil temperature or the temperature at a specific hotspot of the solid insulation, or of the transformer, respectively. The hot oil temperature is typically measured in the region of a cover of a housing of the transformer that is filled with oil, wherein the transformer winding and the transformer core are disposed in the housing. The temperature of the hotspot in the solid material usually lies above the hot oil temperature. This value can either be estimated based on the hot oil temperature while considering the load current, or a direct measurement of the hotspot temperature takes place by means of a sensor array which is resistant to high voltages, in particular by means of optical-fiber sensors.

As has already been established, the at least one insulating means can contain a solid insulation as well as a liquid insulation, in particular cellulosic paper and/or oil. The at least one insulating means here serves in particular for electrically insulating the at least one transformer winding, or the metallic conductors of the latter, respectively.

It applies in general that the cooling output is increased as the load increases, or in higher loading state ranges, respectively, and vice versa. The variation of the cooling output can take place in stages as a result of which cooling stages are automatically defined. The cooling output can however also take place in a substantially continuous manner, for example in that a rotating speed is continuously controlled, wherein cooling stages can, however, of course also be defined in this case, for example as specific rotating speed ranges. In this case, reference may also be made to virtual cooling stages. The cooling system is configured by such cooling stages, or virtual cooling stages, respectively.

The loading state ranges associated with the cooling stages can be defined or predefined.

It is understood that the method according to the invention can also be provided as a computer-implemented method.

In principle, it is conceivable that the temperature of the transformer is influenced by various factors which thus implicitly also influence the loading state, or the loading state range, respectively. Of course, it is however also possible that the loading state range, or the loading state, respectively, depends explicitly on further variables, for example on the electrical load, or the current load, respectively, of the transformer, and/or on the ambient temperature. In preferred embodiments of the method according to the invention, these variables can be additionally taken into account. In one preferred embodiment of the method according to the invention it is accordingly provided that the loading state range moreover depends on the current load of the transformer and that the upper cooling stage is only deactivated or remains deactivated, and the cooling stage lying directly below the upper cooling stage is only activated or remains activated, when the current load has dropped below a threshold value and/or does not exceed the threshold value, wherein the threshold value lies below a maximum value of the current load of the transformer in the loading state range associated with the upper cooling stage and within this loading state range.

This means that the attainment of the increased temperature in this case is linked with a current load, or an electrical load, respectively, of the transformer that is reduced in relation to the maximum value. This has the additional advantage that the temperature distribution actually prevailing in the transformer is by far not as heterogeneous as in the case of high operating currents or electrical loads, respectively. Actually, high electrical transformer loads are usually linked to a pronounced heterogeneity of the temperature distribution such that the already mentioned hotspots are prominent, on the one hand, while the more heavily moisturized parts of the insulation specifically have only a rather moderate temperature level, on the other hand. Most of the moisture is then deposited in the cooler locations. As a result of the approach according to the invention, a state in which the hotspots are only moderately pronounced and cooler regions are also better heated, or more rapidly dried, is utilized. The risk of pronounced local hotspots associated with extreme aging is practically absent. The worst case, specifically a formation of gas bubbles in the insulation system, which in the high-voltage sector can lead to immediate damage by an explosion and thus to the failure of the transformer, causing a fire risk and a large effort in restoration, can thus also be precluded by means of the method according to the invention.

Specifically, for example, hot oil temperatures which lie in the range of, for example, at most 80° C. can be achieved. The temperature distribution in the transformer which results at these hot oil temperatures in this instance is typically of such a type that only minor hotspots of less than 95° C. arise in the solid insulation. It is to be noted that these numbers mentioned only in an exemplary manner also depend on the heat classification of the materials used.

By generating only minor hotspots, the drying procedure practically does not lead to any increased aging of the at least one insulating means that would be relevant.

Means provided for measuring the corresponding characteristic value, in particular corresponding current or output sensors, respectively, are known per se.

In one particularly preferred embodiment of the method according to the invention it is provided that the threshold value is at most 80%, preferably at most 70%, particularly preferably at most 60%, of the maximum value of the load of the transformer in the loading state range associated with the upper cooling stage. In this way, heterogeneous temperature distributions with harmful hotspots can be significantly reduced, wherein the disadvantage of cooler regions with poorer drying characteristics is also minimized as a result of the increased temperature such that the overall insulation, or all of the insulating means, respectively, is/are imparted a temperature which is advantageous for drying.

In one preferred embodiment of the method according to the invention it is provided that the upper cooling stage is the highest cooling stage. It is ensured in this way by the loading state range associated with the highest cooling stage that the increased temperature being set is particularly high for drying, as a result of which particularly rapid drying can be achieved.

Cooling device controllers which are nowadays used for transformers can be specified, at least to a certain extent, for taking into account aspects which go beyond pure cooling, in that the cooling is controlled in a corresponding manner. For example, such cooling device controllers can control a reduction of the overall losses, an increase of the overload capability and/or a homogenization of the wear and tear on the cooling apparatuses. Such cooling device controllers can advantageously be utilized for carrying out the method according to the invention, in particular in that the software of the respective cooling device controller is correspondingly adapted. It is therefore provided according to the invention in a cooling device controller for a transformer having a multistage cooling system, in particular a power transformer or a choking coil, having at least one transformer winding and at least one insulating means for electrical insulation, that the cooling device controller is specified for carrying out a method according to the invention. That is to say that the cooling device controller can actuate suitable means, in particular of the cooling system, in such a manner that the method according to the invention is carried out with the aid of these means.

As already mentioned, the cooling device controller to this end can have or use, respectively, corresponding software which is loaded in a memory of the cooling device controller, for example. It is furthermore conceivable that this software can also be transmitted by way of a network or disseminated on a data carrier. Provided according to the invention is therefore a computer program product comprising commands which have the effect that the cooling device controller according to the invention carries out the method according to the invention.

Provided according to the invention in an analogous manner is a transformer, in particular a power transformer or a choking coil, having at least one transformer winding and at least one insulating means for electrical insulation, said transformer comprising a multistage cooling system and the cooling device controller according to the invention.

In one preferred embodiment of the transformer according to the invention it is provided that at least three cooling stages are provided. This facilitates the achievement of temperatures which are increased to a sufficient extent for rapid drying, and at the same time an ideally homogeneous distribution of temperature, because the cooling stage that lies directly below the upper cooling stage does not have to be the lowest cooling stage.

With a view to optimal insulation, on the one hand, and effective cooling, on the other hand, it is provided in one preferred embodiment of the transformer according to the invention that the at least one insulating means comprises insulating liquid, in particular oil, and preferably a solid-material insulation comprising cellulose. The insulating liquid, or the oil, respectively, here simultaneously functions as insulation and as a coolant. This here can be, for example, mineral oil, vegetable oil, or synthetic liquids such as silicone oil. Moreover, insulating liquids having elevated flashpoints are conceivable.

With a view to optimal insulation, on the one hand, and effective cooling, on the other hand, it is further provided in one preferred embodiment of the transformer according to the invention that the at least one insulating means comprises a solid-material insulation which preferably comprises cellulose or aramid. For example, cellulosic paper or a pressboard material can be provided as a hygroscopic material like cellulose as a solid-material insulation which typically surrounds the at least one transformer winding, or the windings of the latter, respectively. Aramid in turn has advantageous properties above all at very high temperatures, wherein aramid also absorbs moisture while nevertheless being able to be impregnated to a certain extent.

In particularly preferred embodiments of the transformer according to the invention it is provided for optimal cooling while using insulating liquid or oil, respectively, that the following cooling stages are provided in an ascending order: ONAN, ONAF; or KNAN, KNAF; or ODAF1, ODAF2; or KDAF1, KDAF2; or OFAF1, OFAF2; or KFAF1, KFAF2; or ONAN, OFAN; or KNAN, KFAN; or ONAN, ODAN, ODAF; or KNAN, KDAN, KDAF; or ONAN, ONAF1, ONAF2; or KNAN, KNAF1, KNAF2.

In these particularly preferred exemplary embodiments, dual-stage as well as triple-stage cooling systems are provided.

The descriptions stated are terms which are commonplace in cooling technology, cf. https://de.wikipedia.org/wiki/Kühlung. "O" stands for "oil", "K" stands for an insulating liquid, insulating liquid with a heat classification, or a flashpoint, respectively, that is increased in comparison to oil, "N" stands for "natural" (the respective medium, or fluid, respectively, here is moved only by virtue of naturally occurring convection), "F" stands for "forced" (here pumps are used for moving the medium, or the fluid, respectively), "D" stands for "directed" (pumping here takes place in a targeted or directed manner, respectively, toward the windings), "A" stands for "air". The numerals in an ascending order describe an increased number of the corresponding cooling means for moving the respective cooling medium/fluid, that is to say that AF1 stands for a specific number of fans, or ventilators, respectively, whereas AF2 stands for a comparatively higher number of ventilators.

It is to be noted that radiators as well as coolers can be used, wherein coolers mandatorily require fans and pumps, whereas natural convection of the cooling media/fluids can also be provided in the case of radiators.

It is also to be noted in general that, apart from air, another cooling fluid, for example another gas or a liquid such as, for example, water, could also be used.

Moving on to the exemplary embodiments ONAN, ODAN, ODAF, and KNAN, KDAN, KDAF:

ODAF stands for "Oil Directed Air Forced", that is to say that the oil by means of at least one oil pump is pumped in a directed manner and at least one fan is switched on, as a result of which the highest cooling stage with the strongest cooling is implemented. The oil here circulates in a cooling circuit which comprises at least one radiator for exchanging heat with the environment and at least one fan, or ventilator, respectively, preferably at least one axial ventilator, in which the rotation axis of a rotor runs parallel to an air flow, or so as to be axial with the latter, respectively. As a result of the at least one fan, substantially increased cooling of the at least one radiator, or a substantially increased heat exchange with the ambient air, respectively, can be achieved in comparison to cooling by natural convection.

KDAF describes a cooling stage which is analogous to ODAF, wherein an insulating liquid with an increased heat classification, or an increased flashpoint, respectively, is used instead of oil.

By switching off the at least one fan, only the air circulation by virtue of natural convection remains such that the cooling output in the medium cooling stage is reduced in relation to the highest cooling stage. Accordingly, ODAN stands for "Oil Directed Air Natural".

KDAN describes a cooling stage which is analogous to ODAN, wherein the insulating liquid with an increased heat classification, or an increased flashpoint, respectively, is used instead of oil.

When the at least one pump is now also switched off, the oil can still circulate only by virtue of the natural convection as a result of which the cooling output in the lowest cooling stage is yet again reduced in relation to the medium cooling stage. Accordingly, ONAN stands for "Oil Natural Air Natural".

KNAN describes a cooling stage which is analogous to ONAN, wherein the insulating liquid with an increased heat classification, or an increased flashpoint, respectively, is used instead of oil.

BRIEF DESCRIPTION OF THE FIGURES

The invention will now be explained in more detail by means of an exemplary embodiment. The drawing is exemplary and is indeed intended to visualize the concept of the invention but not to restrict the latter or even reflect the latter in an exhaustive manner. In the drawing:

The FIGURE shows a schematic illustration of a transformer according to the invention.

WAYS OF IMPLEMENTING THE INVENTION

The FIGURE shows a schematic illustration of a transformer 1 according to the invention which possesses a transformer winding 3 which is wound about a transformer core 10. The transformer winding 3 is composed at least of a low-voltage winding as well as a high-voltage winding which are not illustrated in more detail. Furthermore, the transformer winding 3, more specifically the electric conductor thereof, for electrical insulation is wrapped with cellulosic paper (not specifically illustrated).

The transformer winding 3 and the transformer core 10 are disposed in a housing 2 of the transformer 1, said housing 2 being filled with a transformer oil 7. The transformer oil 7 can be, for example, mineral oil. The transformer oil 7 likewise serves for electrical insulation, on the one hand. That is to say that insulating means of the transformer 1 comprise the transformer oil 7 and the cellulosic paper, wherein the latter is accordingly impregnated with transformer oil 7.

On the other hand, the transformer oil 7 serves for cooling because the transformer winding 3 during the operation of the transformer 1 generates heat which intensifies as the electrical load, or the current load, respectively, of the transformer 1 increases. The transformer oil 7 here can circulate in a cooling circuit 4 which comprises the housing 2. The circulation of the transformer oil 7 can take place by natural convection and/or be forced by means of a pump 11. Furthermore, at least one radiator 5 for enabling an exchange of heat between the transformer oil 7 and the ambient air is provided in the cooling circuit 4. The radiator 5 here is cooled by the ambient air, wherein the ambient air absorbs heat from the radiator 5. Cooler ambient air can be supplied to the radiator 5 by way of natural convection and/or by means of at least one ventilator 6. When the cooling of the radiator 5 takes place by means of the ventilator 6, ambient air is suctioned by the ventilator 6 and, at an outlet side 9 of the ventilator 6 that faces the radiator 5, blown onto the radiator 5.

In the exemplary embodiment illustrated, the transformer oil 7, the pump 11, the radiator 5 and the ventilator 6 of the latter are in particular used for implementing three cooling stages—a lowest cooling stage, a medium cooling stage, and a highest cooling stage—of the transformer 1.

These cooling stages are associated with respective loading state ranges, that is to say that each of the cooling stages is assigned to a loading state range, wherein each loading state range comprises a range of loading states which cause aging of the transformer 1. The loading state, or the loading state range, respectively, here depends at least on the temperature of the transformer 1. In the exemplary embodiment illustrated, the loading state, or the loading state range, respectively, moreover depends explicitly on the electrical load, or the current load, respectively, of the transformer 1.

As the loading state range increases, ever higher cooling stages are successively activated by means of a cooling device controller 8, and the higher cooling stages are successively deactivated as the loading state range decreases. That is to say that the lowest cooling stage is associated with a low loading state range, the medium cooling stage is associated with a medium loading state range, and the highest cooling stage is associated with a high loading state range.

Dotted lines in the FIGURE indicate that the cooling device controller 8 is operatively connected to the pump 11 and the ventilator 6 in order for said pump 11 and said ventilator 6 to be selectively switched on or off. The chain-dotted line in the FIGURE indicates that the cooling device controller 8 processes items of information pertaining to the current loading state, or loading state range, respectively, of the transformer 1. These items of information can be made available by way of means known per se, in particular sensors for the temperature of the transformer 1 as well as for the electrical power consumption or for the current flowing on the secondary side of the transformer 1.

The highest cooling stage in the exemplary embodiment illustrated is ODAF (“Oil Directed Air Forced”), that is to say that the transformer oil 7 is pumped by the pump 11 in a directed manner through the cooling circuit 4, and the ventilator 6 is activated such that a maximum cooling output is implemented.

By switching off the ventilator 6, ODAN (“Oil Directed Air Natural”) as the medium cooling stage in the exemplary embodiment illustrated is implemented, in which medium cooling stage only the circulation of air by virtue of natural convection remains such that the cooling output in the medium cooling stage is reduced in relation to the highest cooling stage. It is to be noted that it would alternatively also be conceivable for the medium cooling stage to be implemented by switching off the pump 11 and permitting the ventilator 6 to run, which would be described as ONAF (“Oil Natural Air Forced”).

When the pump 11 in the exemplary embodiment illustrated is now also switched off, the transformer oil 7 can still circulate only by virtue of the natural convection, as a result of which the cooling output in the lowest cooling stage is reduced yet again in relation to the medium cooling stage. That is to say that the lowest cooling stage in the exemplary embodiment illustrated is ONAN (“Oil Natural Air Natural”).

The cooling device controller 8 is moreover specified for carrying out a method according to the invention for drying, that is to say for actuating in particular the pump 11 and the ventilator 6 depending on the loading state range of the transformer 1 such that the method according to the invention is carried out as follows during the operation of the transformer 1: An upper cooling stage which lies above the lowest cooling stage is deactivated or remains deactivated, and the cooling stage lying directly below the upper cooling stage is activated or remains activated, while the transformer 1 is situated in the loading state range associated with the upper cooling stage. In the exemplary embodiment illustrated here, the upper cooling stage is only deactivated or remains deactivated, and the cooling stage lying directly below the upper cooling stage is only activated or remains activated, when the current load has dropped below a threshold value and/or does not exceed the threshold value, wherein the threshold value lies below a maximum value of the current load of the transformer 1 in the loading state range associated with the upper cooling stage and within this loading state range.

The upper cooling stage is preferably the highest cooling stage.

The threshold value in relation to the maximum value of the current load of the transformer 1 in the loading state range associated with the upper cooling stage can be reduced, for example, by at least 20%, preferably by at least 30%, particularly preferably by at least 40%.

Further illustration of the method according to the invention:

The following table A provides an example for conventional triple-stage cooling of the transformer 1 illustrated in the FIGURE. The stated typical load current is stated as a percentage of the nominal current, or the maximum load current, respectively. The stated load current here typically depends on the ambient temperature and the dynamics of the system, and at high ambient temperatures is thus correspondingly displaced toward smaller percentage values, and at low ambient temperatures conversely displaced toward higher percentage values. To this extent, a high ambient temperature is advantageous when applying the drying mode, or the method according to the invention, respectively, for drying, in order to achieve efficient drying even in the case of comparatively small load currents.

The loading state range which is in each case associated with the cooling stages is a function of both the temperature of the transformer 1, wherein the temperature can in particular be a hot oil temperature, as well as of the load current.

TABLE A

CONVENTIONAL TRIPLE-STAGE COOLING

| Cooling stage | 1 | 2 | 3 |
|---|---|---|---|
| Type | ONAN | ONAF | ODAF |
| Switched-on ancillary apparatuses | — | Fan | Pumps + Fan |
| Threshold temperature "On" [° C.] | | 60 | 70 |
| Threshold temperature "Off" [° C.] | | 50 | 60 |
| Occurring temperatures [° C.] | <60 | 50-70 | >60 |
| Typical load current | <60% | 60-80% | >80% |

An embodiment of the drying method according to the invention is illustrated in contrast in the following Table B. It goes without saying that it also applies to the method according to Table B that the loading state range which is in each case associated with the cooling stages is a function of both the temperature of the transformer 1, wherein the temperature can in particular be a hot oil temperature, as well as of the load current.

TABLE B

EMBODIMENT OF THE METHOD ACCORDING TO THE INVENTION

| Cooling stage | 1 | 2 | 3 |
|---|---|---|---|
| Type | ONAN | ODAN | ODAF |
| Switched-on ancillary apparatuses | — | Pumps | Pumps + Fan |
| Load current <70% | | | |
| Threshold temperature "On" [° C.] | | 70 | 80 |
| Threshold temperature "Off" [° C.] | | 65 | 76 |
| Occurring temperatures [° C.] | <70 | 65-80 | >75 |
| Drying mode: >60° C. | | | |
| Load current ≥70% | | | |
| Threshold temperature "On" [° C.] | | 68 | 70 |
| Threshold temperature "Off" [° C.] | | 60 | 66 |
| Occurring temperatures [° C.] | <68 | 60-70 | >65 |
| Drying mode: >60° C. | | | |

Two cases are illustrated in Table B, specifically one for a load current of <70% of the nominal current, and one for a load current of ≥70% of the nominal current. Efficient drying here takes place in each case at more than 60° C.

It is to be noted that it is derived from Table B that the medium cooling stage ODAN is chosen instead of ONAF, for which no structural modification has to be performed on the transformer 1. The corresponding types of cooling are simply set by way of the cooling device controller 8.

In comparison to the conventional cooling according to Table A, in the embodiment of the method according to the invention illustrated in Table B the second cooling stage is used especially in loading state ranges which are associated with the highest cooling stage according to Table A. Accordingly, the temperatures occurring in the operation of the second cooling stage in Table B are significantly higher than in Table A, this enabling efficient drying during the operation of the transformer 1.

LIST OF REFERENCE SIGNS

1 Transformer
2 Housing of the transformer
3 Transformer winding, having cellulosic paper wrapped around the conductor
4 Cooling circuit
5 Radiator
6 Ventilator
7 Transformer oil
8 Cooling device controller
9 Outlet side of the ventilator
10 Transformer core
11 Pump

The invention claimed is:

1. A method for drying a transformer with a multistage cooling system, the transformer having at least one transformer winding and at least one insulator for an electrical insulation;

the cooling system having cooling stages with a lowest cooling stage and a highest cooling stage, wherein said cooling stages are respectively associated with one loading state range of the transformer and are activated when a respective loading state range of the transformer is reached, and wherein the loading state range is a function that depends at least on a temperature of the transformer;

the method for drying the transformer, to be carried out during an operation of the transformer, comprising:

while the transformer is operating in the loading state range that is associated with a given upper cooling stage which lies above the lowest cooling stage, deactivating, or maintaining in a deactivated state, the given upper cooling stage, and activating, or maintaining in an activated state, a cooling stage which lies directly below the given upper cooling stage.

2. The method according to claim 1, wherein the transformer is a power transformer or a choking coil.

3. The method according to claim 1, wherein the loading state range also depends on a current load of the transformer, and the method comprises:

only deactivating, or maintaining in the deactivated state, the given upper cooling stage, and only activating, or maintaining in the activated state, the cooling stage lying directly below the given upper cooling stage, when the current load has dropped below or does not exceed a threshold value, the threshold value lying below a maximum value of the current load of the transformer within the loading state range associated with the given upper cooling stage and within the loading state range.

4. The method according to claim 3, which comprises defining the threshold value at no more than 80% of the maximum value of the current load of the transformer in the loading state range associated with the given upper cooling stage.

5. The method according to claim 4, which comprises defining the threshold value at no more than 70% of the maximum value of the current load of the transformer in the loading state range associated with the given upper cooling stage.

6. The method according to claim 5, which comprises defining the threshold value at no more than 60% of the maximum value of the current load of the transformer in the loading state range associated with the given upper cooling stage.

7. The method according to claim 1, wherein the given upper cooling stage is the highest cooling stage.

8. A cooling device controller for a transformer having a multistage cooling system, having at least one transformer winding and at least one insulator for an electrical insulation, the cooling device controller being configured for carrying out the method according to claim 1.

9. The cooling device controller according to claim 8, configured for a power transformer or a choking coil.

10. A transformer, comprising:

at least one transformer winding and at least one insulator for an electrical insulation;

a multistage cooling system with a plurality of cooling stages; and a cooling device controller configured for carrying out the method according to claim 1.

11. The transformer according to claim 10, wherein the transformer is a power transformer or a choking coil.

12. The transformer according to claim 10, wherein said plurality of cooling stages comprises at least three cooling stages.

13. The transformer according to claim 10, wherein said at least one insulator comprises an insulating liquid.

14. The transformer according to claim 13, wherein said at least one insulator comprises an insulating oil.

15. The transformer according to claim 10, wherein said at least one insulator comprises a solid-material insulation.

16. The transformer according to claim 15, wherein said solid-material insulation comprises cellulose or aramid.

17. The transformer according to claim 10, wherein said cooling stages are selected from the group consisting of Oil Natural Air Natural (ONAN), Oil Directed Air Forced (ODAF), Oil Directed Air Natural (ODAN), Coolant Natural Air Natural (KNAN), Coolant Directed Air Forced (KDAF), and Coolant Directed Air Natural (KDAN), wherein "O" is oil, "A" is air, and "K" is a coolant of a higher heat classification than oil, and wherein the following cooling stages are provided in ascending order:

ONAN, ONAF; or KNAN, KNAF;

or ODAF1, ODAF2; or KDAF1, KDAF2;

or OFAF1, OFAF2; or KFAF1, KFAF2;

or ONAN, OFAN; or KNAN, KFAN;

or ONAN, ODAN, ODAF; or KNAN, KDAN, KDAF;

or ONAN, ONAF1, ONAF2; or KNAN, KNAF1, KNAF2.

18. A computer program product, comprising a non-transitory computer program code with instructions which, when loaded into a cooling device controller, are configured to carry out the method according to claim 1.

* * * * *